Figure 1:
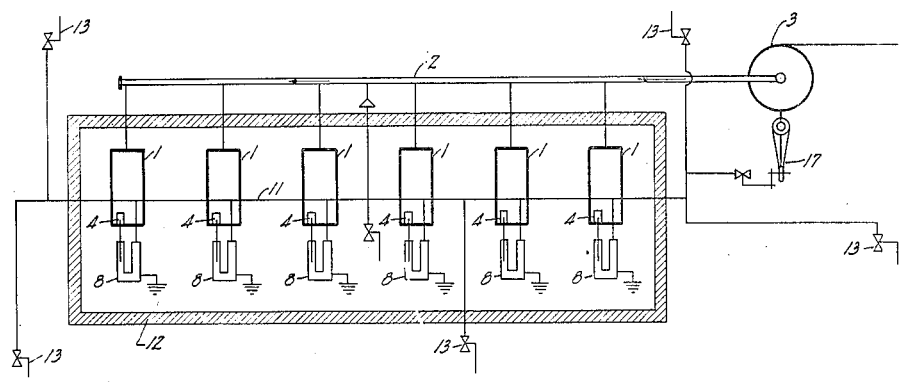
Figure 2:
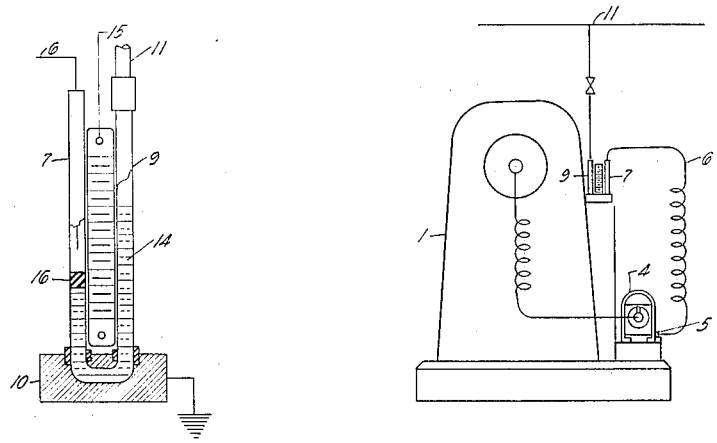
Figure 3:
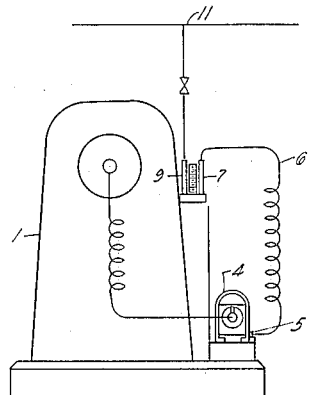

July 13, 1937.  J. C. HERRON  2,086,869
REMOTE CONTROL SYSTEM
Filed Nov. 23, 1935

Inventor: John Cuthbert Herron

By his Attorney: H. Birch

Patented July 13, 1937

2,086,869

UNITED STATES PATENT OFFICE 2,086,869

REMOTE CONTROL SYSTEM

John Cuthbert Herron, Long Beach, Calif., assignor to Shell Development Company, San Francisco, Calif., a corporation of Delaware Application November 23, 1935, Serial No. 51,317

1 Claim. (Cl. 230—3)

This invention relates to means for stopping the operation of internal combustion motors and is particularly concerned with apparatus for electrically breaking the ignition circuits in an emergency.

In compressor plants in which the compressors are operated by internal combustion engines of the spark ignition type it has been a past practice to tap the high tension secondary cables of the magnetos of the engines, and to carry leads to a switch outside the compressor building. Such systems have been very difficult to keep in operation as interference between the magnetos results from induced currents between the parallel cables from the magnetos to the multiple switch. The condenser effect of long high tension cables and leakage through the insulation are other drawbacks to this system.

Another method of shutting down a compressor plant has been to ground the magnetos of the engines on the low tension side. Such a method however requires ground wires through long conduits to multiple switches outside the compressor building with attendant disadvantages.

Still another method of stopping the plant where the compressors are operated by gas engines, is to shut off the main fuel supply. However, as all gas engine plants have fuel headers under considerable pressure with individual pressure regulators reducing this pressure to the engines, there is enough fuel stored in the header to run the engines for several minutes after the main valve is closed. In the case of an emergency shut-down (required because of a compressor cylinder head blowing out or the like) the continued operation of the engines has in the past resulted in serious explosions.

It is an object of this invention to overcome the disadvantages of previous methods of closing down compressor plants in an emergency.

It is another object of this invention to devise a system of shutting down compressor plants from different locations outside the compressor building. A further object of this invention is to devise a system of shutting down compressor plants by venting a source of pressure or vacuum to the atmosphere. The further objects of this invention will be apparent to those skilled in the art from the following detailed description of a specific embodiment of my invention. Throughout this description reference is made to the accompanying drawing of which:

Fig. I is a schematic diagram of plant showing the system installed.

Fig. II is an elevation partly in section of manometer unit.

Fig. III is an end elevation of a gas engine showing manometer connected.

Referring to Figs. I and III numeral 1 represents identical gas engine compressor units, which units are all connected to a compressor intake header (2). The header is connected by a suitable conduit to the top of a gas separator or scrubber (3) into which gas lines from a source of gas to be compressed are discharged. The magnetos (4) of the gas engines driving the compressors are each provided with grounding or short circuiting terminals (5) so that in order to prevent a spark being produced in the engine it is necessary to electrically connect this terminal to ground; that is, any metallic part of the base of the unit. A wire (6) from each of the magneto grounding terminals (5) is led into a glass side arm (7) of a manometer (8) with which each engine is provided. This manometer is shown in detail in Fig. II. Each manometer consists of glass tubes (7) and (9) fitted at one end into the upper side of metallic block (10) provided with a passageway therethrough so that the assembled device has a continuous passage from one glass arm into the other. The wire (6) is bared for the length it is inserted in the arm (7). The other arm (9) of the manometer is connected to a conduit system (11) connected to a source of vacuum such as the compressor intake header (2). The manometer is approximately half filled with mercury (14). The metallic block (10) of the manometer is electrically connected to the base of the particular engine to which it is fitted. As will be seen from Fig. I, piping connects all the manometers in parallel to the compressor intake header. This same piping leads to various points outside the compressor building, the walls of which are indicated by numeral (12). The various ends of this conduit are provided with valves (13).

When the compressors are working there is always a vacuum in the intake header. This vacuum is several inches of mercury so that, as will be apparent, the level of mercury in the arms (9) of the manometers connected to the intake header will be higher than that in the arms (7) in which the wires from the magnetos are respectively located. A graduated scale (15) mounted on the base of each manometer readily informs the operator of the amount of vacuum applied to each manometer.

It will thus be seen that when it is necessary to close down the plant the opening of any one of the valves (13) (thus returning the pressure in the conduit system to atmospheric) will ground the magnetos, for as the mercury falls in arm (9) it will rise in arm (7) to such a point that contact is made between the wire (6) and the mercury (14). The wire is thereby electrically connected to ground through the mercury (14) and the metallic block (10). As a precaution against the possibility of sparking taking place upon the mercury touching the end of the wire (6) a small amount of thin oil or carbon tetrachloride (16) may be placed over the mercury in arm (7).

As one of the chief dangers of accident to the compressor plant is due to accumulation of liquid in cylinders of the compressor, a gas scrubber or separator (3) is usually positioned between the compressor intake header and the source of gas supply as previously mentioned. The scrubber may be fitted with a float operated cock (17) connected to the conduit system whereby upon the level of liquid in the scrubber becoming too high (so that danger of liquid flowing into the compressor header is likely) the cock will be opened to the atmosphere thus stopping the compressors.

It will be seen at once that the system set forth in this specification provides a simplified arrangement whereby the plant may be shut down from one of many stations located outside the compressor building. This is especially advantageous in the case of accident in the building or fire in the plant. There is no need for the operator to go into the building to close down the compressors. With the valves (13) located at various points it will be generally possible to safely reach at least one of the valves and thus shut down the compressors.

Instead of using a conduit system under a pressure below atmospheric it is possible to maintain the conduit system under a slight pressure above atmospheric. In such case the wire from the magneto and the connection from the manometer to the conduit system should be located in the same arm as will be apparent.

These and other variations of my invention will be readily apparent to those skilled in the art.

I claim as my invention:

In a system for the control of a number of compressor-gas engine units fitted with magneto ignition and connected to a common compressor intake header, the combination comprising U-tubes attached to said compressor-gas engine units, mercury in said U-tubes, said mercury being grounded to said compressor-gas engine units, piping connecting one arm of each of said U-tubes to said compressor intake header, electrical conduits from the magnetos of said compressor-gas engine units extending partly into the other arm of each of said U-tubes and valves in the said piping for admitting air thereto.

JOHN CUTHBERT HERRON.